United States Patent [19]

DePuydt et al.

[11] 4,153,143
[45] May 8, 1979

[54] TRAILER BRAKE ACTUATING ASSEMBLY

[75] Inventors: Frank A. DePuydt; Eugene P. Conradi, both of Des Moines, Iowa

[73] Assignee: Dico Company, Inc., Des Moines, Iowa

[21] Appl. No.: 868,940

[22] Filed: Jan. 12, 1978

[51] Int. Cl.² .............................................. B60T 7/20
[52] U.S. Cl. .............................................. 188/122 R
[58] Field of Search ........................... 188/112, 3 R

[56] References Cited

U.S. PATENT DOCUMENTS

| | | | |
|---|---|---|---|
| 2,993,568 | 7/1961 | Henry | 188/112 |
| 3,026,975 | 3/1962 | Yoder | 188/112 |
| 3,072,223 | 1/1963 | Yoder | 188/112 |
| 3,271,085 | 9/1966 | Payne | 188/112 X |
| 3,334,712 | 8/1967 | Branson | 188/112 |

Primary Examiner—Duane A. Reger
Attorney, Agent, or Firm—Rudolph L. Lowell

[57] ABSTRACT

A hitch and trailer brake assembly for selectively actuating the brake system of a trailer includes a pair of tubular telescoping members, one of which is fastened to the trailer and the other of which is fastened to the vehicle towing the trailer, a hydraulic cylinder unit that serves as a source of fluid under pressure operable in response to relative movement between the telescoping members to actuate the trailer brakes, and a valve member for maintaining the trailer brakes inoperative until the pressure supplied by the hydraulic unit reaches a predetermined pressure.

1 Claim, 3 Drawing Figures

U.S. Patent  May 8, 1979  4,153,143
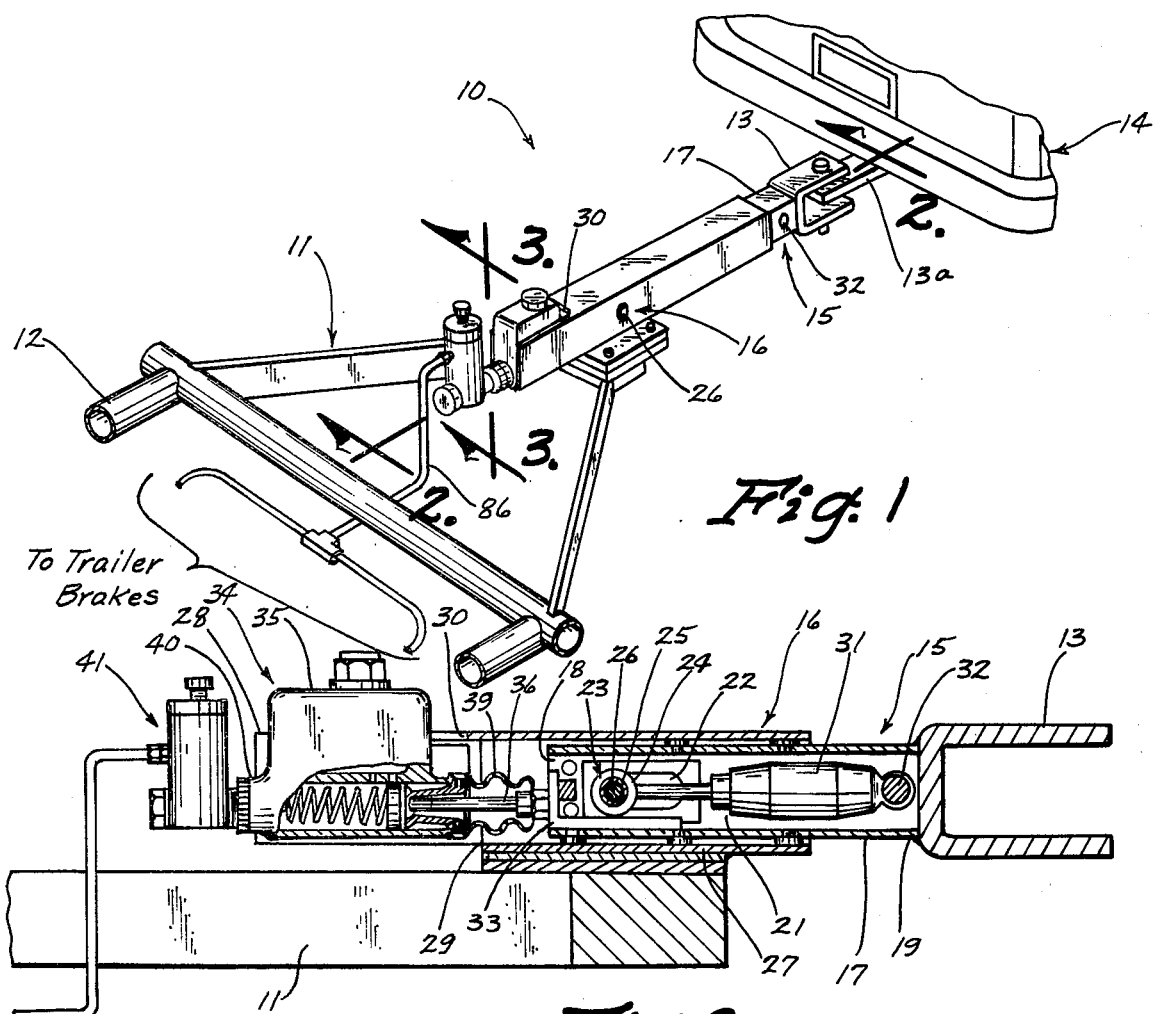
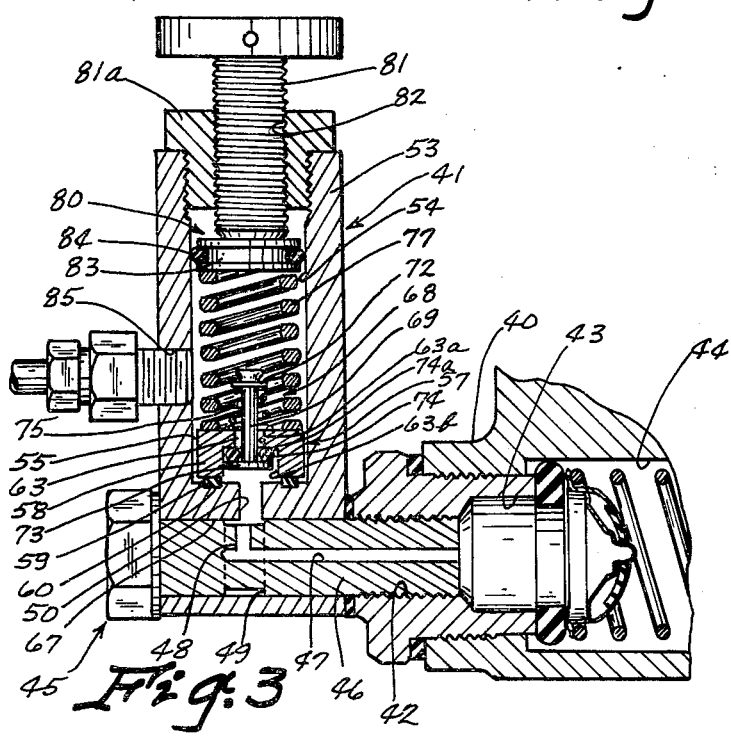

TRAILER BRAKE ACTUATING ASSEMBLY

BACKGROUND OF THE INVENTION

1. Field of the Invention

The present invention relates in general to brake assemblies for actuating the brakes of a trailer being towed and more specifically to such assemblies that include means for controlling brake activation such that the brakes are activated only when certain predetermined conditions exist.

2. Description of the Prior Art

A wide variety of hitch and trailer brake assemblies for actuating the trailer brakes of a trailer are known in the art. A typical form of such assemblies includes two telescoping members, one of which is connected to the trailer and the other of which is connected to the towing or tractor vehicle. On deceleration of the tractor with respect to the trailer the resultant relative movement between the telescoping members provides for the activation of a hydraulic unit to supply hydraulic fluid under pressure to the trailer brakes.

Under most operating conditions, the above-described assemblies provides satisfactory brake actuation. However, these assemblies can create problems under certain conditions of road operation, for example mountain driving wherein the towing vehicle is often geared down for braking purposes. Under such conditions, the weight or coasting action of the trailer actuates the hydraulic unit to the trailer brakes. Heating of the trailer brakes results so as to often times effect a fading of the trailer brakes upon their later use.

One approach in compensating for the above problem is described in a U.S. Patent to Horne, No. 2,407,156, issued Sept. 3, 1946. The assembly disclosed by Horne includes a hydraulic unit mounted on a trailer tongue having a piston member attached to a vehicle. Consequently, when the vehicle is decelerated with respect to the trailer, the piston member is retracted to supply fluid under pressure for application to the trailer brake system. The piston acts against a coil spring having an adjustable pressure to provide a spring force that must be overcome before retractive movement of the piston can take place. Thus, the Horne assembly maintains the brakes of the trailer inoperative until a predetermined minimum force is exerted on the piston due to relative movement between the trailer and its towing vehicle. Fluid is thus supplied to the trailer brakes when the trailer force applied on the piston exceeds the initial spring pressure acting on the piston. The spring thus functions merely to dampen a free piston movement.

The present invention differs from the Horne assembly in that it includes a valve means interposed between a source of fluid under pressure and the trailer brake system to provide a precise means for controlling trailer brake actuation. Moreover, the valve means totally blocks fluid flow to the brake system until a predetermined fluid pressure is reached, at which time fluid is supplied to the brake system at or above the predetermined pressure. Trailer brake operation is thus positively eliminated during down hill travel, or trailer back-up operation, until the predetermined fluid pressure is obtained.

SUMMARY OF THE INVENTION

The present invention provides a hitch and trailer brake assembly for selectively actuating the brake system of a trailer and is formed of a pair of telescoping members, a first of which is secured to a tractor vehicle and a second of which is secured to the trailer, coacting means for limiting relative movement between the first and second members, hydraulic means that serves as a source of hydraulic fluid under pressure for trailer brake actuation and valve means that maintains the trailer brakes inoperative until the pressure of the fluid supplied by the hydraulic means reaches a predetermined level.

In a preferred embodiment, the valve means is interposed between the hydraulic means and the trailer brake system to totally block fluid flow to the brakes until the predetermined pressure is reached. The valve means is then opened, in response to the predetermined fluid pressure, to permit fluid flow to the brakes at a pressure equal to the predetermined pressure. Thus, the present invention prevents undesired trailer brake actuation during down hill travel or trailer back-up operation.

BRIEF DESCRIPTION OF THE DRAWINGS

FIG. 1 is a perspective view of the hitch and trailer brake assembly of the present invention shown in assembly relation with a towing vehicle.

FIG. 2 is a longitudinal cross-sectional view of the assembly of FIG. 1 taken along the line 2—2 in FIG. 1; and FIG. 3 is an enlarged sectional detail view taken along the line 3—3 in FIG. 1.

DETAILED DESCRIPTION OF THE PREFERRED EMBODIMENT

A preferred embodiment of the trailer hitch and brake assembly of this invention indicated generally at 10 is shown in FIG. 1 with a tongue structure 11 of a trailer vehicle, only the frame portion 12 of which is shown, having a hitch 13 connected in a usual manner to drawbar 13a at the rear end of vehicle 14.

The hitch and brake assembly 10, as best appears in FIG. 2, includes a pair of inner and outer hitch units 15 and 16, respectively, with the inner unit 15 being telescopically received within the outer unit 16 for relative longitudinal movement. The inner hitch unit 15 includes a tubular casing member 17 having an open rear end 18 and a closed front end 19 secured to the hitch 13. Spaced forwardly of the rear end 18 and formed in side walls 21 of the casing member 17 is a pair of oppositely arranged longitudinally extended slots 22, only one of which is shown.

Mounted within the rear end section 18 of the inner casing member 17 is a roller assembly 23 that includes a pair of rollers 24. A sleeve bearing 25 for mounting the rollers 24 has an axle 26, the opposite ends of which project through the slots 22 for termination in the side walls of an outer tubular casing member 27 of the outer hitch unit 16 so that the axle 26 and the slots 22 serve as coacting means for limiting the longitudinal contracting and expanding movement between the hitch units 15 and 16. The casing member 27 has an open rear end 28, an open bottom 29 and a channeled top 30.

Located within the front end section 19 of the inner casing member 17 is a longitudinally extended dashpot 31, the forward end of which is pivoted on a transverse pin 32 extended between and supported by the side walls 21 of the member 17. The dashpot 31 is connected to the roller assembly 23 at a position located between the rollers 24. As is well known, the dashpot 31 functions to reduce hunting action between the hitch units 15 and 16 during trailer towing operation. An L-shaped abutment 33 is fixed in the rear end section 18 of the inner casing member 17 for a purpose to be described below.

A master cylinder assembly 34 is bolted in the rear end section 28 of the outer casing member 27 and projects upwardly through the channeled top 30 thereof. The assembly 34 is a usual type and comprises a cylinder and reservoir unit 35 having a piston 36 that protrudes from one end thereof for extension longitudinally of the casing member 27. The forward section of the piston 36 projects from the cylinder and reservoir unit 35 and is enclosed by a rubber bellows 39.

On application to the brakes of the towing vehicle 14, the outer casing member 27, the rollers 24 and the cylinder and reservoir unit 35 of the master cylinder assembly 34, move as a unit in a forward direction relative to the inner casing member 17 against a retarding effect of the dashpot 31. As the cylinder and reservoir unit 35 move in a forward direction, the upwardly extended portion of the abutment 33 prevents such movement of the piston 36, which is thereby forced further into the unit 35. The master cylinder assembly 34 thus increases the pressure of hydraulic fluid delivered from an outlet end 40 of the reservoir unit 35. Such fluid is supplied to a valve assembly 41 operatively interposed between the unit 35 and a trailer braking system, such as disclosed in U.S. Pat. No. 2,973,839 incorporated by reference herein, to permit fluid flow to the brake system only when fluid pressure reaches a predetermined minimum to thereby effect actuation of the trailer brakes.

Referring now to FIG. 3, the reservoir unit outlet end 40 has a threaded axial bore 42 leading from an outlet port 43 of a reservoir unit fluid chamber 44. A bolt 45 has its shank 46 extended through the lower portion of the valve assembly 41 for threaded engagement in the bore 42. An axial passage 47 in the bolt shank 46 has one end open to the reservoir unit outlet port 43 and an opposite end terminating in a radially extended outlet 48 that opens into a circumferential groove 49 formed in the shank 46. The groove 49 insures that communication will exist between the outlet 48 of the passage 47 and an inlet port 50 of the valve assembly 41 so long as the port 50 and the groove 49 are opposite each other.

The valve assembly 41 has a tubular valve body 53 with an axial bore or interior chamber 54 open at one end to the inlet port 50 which constitutes an axial extension on the chamber 54. Located within the chamber 54 at the port 50 is a combination check and bleed valve 57 that includes a cylindrically shaped primary valve 58 mounted in a concentrically spaced relation within the chamber 54 to form an annular fluid passage 55. The valve 58 is seated against an O-ring 59 positioned in an annular groove 60 in the bottom wall of the chamber 54. The primary valve member 58 includes a stepped central bleed passage 63 having an upper portion 63a and a lower enlarged portion 63b. A secondary valve member 68 has a valve stem 69 disposed through the upper passage portion 63a. The stem 69 has an abutment collar 72 near its upper end and a disk shaped head 73 at its bottom end.

An O-ring 74 on the valve stem 69 is positioned against the valve head 73. The O-ring 74 is normally in seating engagement with a shoulder 74a, formed at the junction of the portions 63a and 63b of the bleed passage 63, by a coil spring 75 positioned between the primary valve member 58 and the collar 72. The reduced bleed passage portion 63a is, thus normally sealed to fluid flow coming from the cylinder and reservoir unit 35.

The primary valve member 58 is urged against the O-ring 59 by a coil spring 77 longitudinally disposed in the chamber 54 with one end concentrically positioned about the coil springs 75. The spring 77 is arranged in a partially compressed state between a sealing member 80 positioned in the chamber 54 remote from the bleed passage 63, and the primary valve member 58. An adjustable screw 81 threadable through an axial bore 82 formed in a plug 81a, which constitutes an end wall of the chamber 54, engages the sealing member 80 and serves as a means for varying the compression pressure of the coil spring 77. The sealing member 80 is disk shaped and has a circumferential recess 83 for receiving an O-ring 84.

Under normal conditions, the seated primary valve 58 and secondary valve 68 prevent fluid flow from the cylinder and reservoir unit 35 through the valve assembly 41. Such flow occurs only when the pressure of hydraulic fluid supplied by the unit 35 to the assembly 41 reaches a sufficient minimum level to overcome the downward force exerted on the primary valve 58 by the spring 77 so that the valve 58 will be moved from its seated relationship with the O-ring 59. At such time fluid, at a pressure equal to or greater than the minimum pressure, will flow into the chamber 54 through the inlet port 50 for exit through an outlet port 85 connected to the supply line 86 for the trailer brake system. The minimum pressure level at which the valve 58 is unseated is determined by the adjustment of the screw 81 which is manually adjustable.

Actuation of the trailer brakes, thus, takes place in response to a difference in the surge pressure between the towing vehicle and the trailer of a value sufficient to provide the predetermined minimum fluid pressure for trailer brake operation. When the surge pressure is reduced by brake actuation the telescoping casing members 17 and 27 are moved to relative positions to extend the piston 36 from the cylinder and reservoir unit 35 and the brake system fluid pressure drops below the minimum pressure required to maintain the primary valve 58 in an inseated condition. Consequently, the valve 58 reseats to again cut off fluid flow from the unit 35 to the trailer brake system.

At that time, the fluid pressure in the line 86 between the assembly 41 and the trailer brakes exceeds the fluid pressure in the system between the assembly 41 and the unit 35. This fluid pressure difference acts to unseat and open the secondary valve 68 against the action of the spring 75 to thereby open the bleed passage 63. As a result, fluid is permitted to flow from the trailer brakes into the unit 35 until the brakes are released and the pressures of the fluid on each side of the valve assembly 41 are substantially equalized.

It has, thus, been shown and described how the present invention provides a precise means for controlling trailer brake actuation in a manner that substantially eliminates a constant or frequent trailer brake operation under conditions where such operation is not required and is undesirable. As previously mentioned such operation in down hill travel may have dangerous consequences in later failure of the trailer brakes due to fading. Also, the present invention permits free wheeling trailer back-up operation.

Although the invention has been described with respect to a preferred form thereof, it is to be understood that it is not to be so limited since changes can be made therein which are within the full intended scope of this invention as defined by the appended claims.

I claim:

1. A hitch and trailer brake assembly, for a trailer and tractor combination, for selectively actuating the brake system of said trailer, said assembly comprising:
    a. a pair of telescoping members, a first of which is secured to the tractor and the second of which is secured to the trailer;
    b. coacting means on said first and second members limiting the relative longitudinal contracting and expanding movement therebetween;
    c. hydraulic means mounted on said second member engageable with said first member on contracting movement of said first member relative to said second member to provide a source of fluid at a pressure that is progressively increased in response to said contracting movement;
    d. valve means for maintaining the trailer brake system inoperative until the pressure of the fluid supplied by the hydraulic means reaches a predetermined pressure, whereupon said valve means is actuated to provide fluid to said brake system at a pressure equal to or greater than said predetermined pressure,
    e. said valve means including a valve body having a chamber means therein with an inlet port and an outlet port;
    f. a valve assembly for opening and closing said inlet port;
    g. yieldable valve means for closing said inlet port until the pressure of the fluid supplied by the hydraulic means is greater than the pressure exerted on said valve member by said yieldable means;
    h. said yieldable means including a primary valve member having a bleed passage therein open at one end to said inlet port and at the opposite end thereof to said chamber means, and
    i. a secondary valve member movably supported on said primary valve member for controlling the flow of fluid through said bleed passage,
    j. said secondary valve member operable to open said bleed passage whereby to equalize the fluid pressure on opposite sides of said valve means when the pressure of the fluid applied on the brakes of the trailer brake system is greater than the pressure of the fluid supplied by said hydraulic means.

* * * * *